United States Patent [19]
Sugai et al.

[11] 3,927,394
[45] Dec. 16, 1975

[54] CONTROL SYSTEM FOR COMPUTER USED FOR ON-LINE CONTROL

[75] Inventors: Tetuya Sugai; Hiromu Soga, both of Tokyo; Masayosi Motegi; Hideo Kanno, both of Kawasaki, all of Japan

[73] Assignee: Nippon Steel Corporation, Tokyo, Japan

[22] Filed: Sept. 20, 1974

[21] Appl. No.: 507,673

Related U.S. Application Data

[63] Continuation of Ser. No. 335,762, Feb. 26, 1973, abandoned.

[30] Foreign Application Priority Data

Feb. 29, 1972 Japan .............................. 47-20177
Feb. 29, 1972 Japan .............................. 47-20178

[52] U.S. Cl. ............................................ 340/172.5
[51] Int. Cl.² ........................................... G06F 3/04
[58] Field of Search ...................... 340/172.5; 445/1

[56] References Cited

UNITED STATES PATENTS

| | | | |
|---|---|---|---|
| 3,264,397 | 8/1966 | Glickmann et al. | 340/172.5 |
| 3,308,439 | 3/1967 | Tink et al. | 340/172.5 |
| 3,316,539 | 4/1967 | Carleton | 340/172.5 |
| 3,377,619 | 4/1968 | Marsh et al. | 340/172.5 |
| 3,386,082 | 5/1968 | Stafford et al. | 340/172.5 |
| 3,407,387 | 10/1968 | Looschen et al. | 340/172.5 |
| 3,500,339 | 3/1970 | White | 340/172.5 |
| 3,609,669 | 9/1971 | Weiss et al. | 340/172.5 |
| 3,643,229 | 2/1972 | Stuebe et al. | 340/172.5 |
| 3,644,895 | 2/1972 | Hemdal et al. | 340/172.5 |
| 3,693,161 | 9/1972 | Price et al. | 340/172.5 |

*Primary Examiner*—Raulfe B. Zache
*Assistant Examiner*—Jan E. Rhoads
*Attorney, Agent, or Firm*—Watson Leavenworth Kelton & Taggart

[57] ABSTRACT

The output terminal of an OR circuit is connected to the program interrupt input terminal of a computer used for on-line control. To a plurality of input ends of this OR circuit are connected both the process interrupt output terminals of various devices to be controlled such as experimental devices, analysis devices, production devices and so on and the program interrupt output terminals of the computer controlled according to the computer program. The operation of each of said devices can be done by one computer for on-line control without error.

8 Claims, 12 Drawing Figures

CONTROL SYSTEM FOR COMPUTER USED FOR ON-LINE CONTROL

This is a continuation, of application Ser. No. 335,762, filed Feb. 26, 1973, now abandoned.

BACKGROUND OF THE INVENTION

This invention relates to a control system for a computer used for on-line control and more particularly to such system whereby various experimental devices, analysis devices, measuring devices or production devices, ets. in the laboratory are automatically operated.

As for the utilization of conventional computers for on-line control, a system is used which exclusively assigns one program interrupt input terminal of the computer to the output signal for one phenomenon for which the so-called process interrupt is required. However this system has disadvantages in that the number of program interupt input terminals is increased since such interrupt input terminals are necessary for each different process interupt signal and in that for each program interrupt input terminal the procesing routine must be prepared by the program unit, so that the system becomes too complex to grasp the whole structure and the procedure for making the system becomes very troublesome. Generally speaking, it is customary that each device to be controlled outputs a respective plurality of process interrupt signals. For this reason, if the number of devices to be controlled are increased, the number of program interrupt signal terminals provided in the computer becomes insufficient, and it is possible that one computer can not effect processing of all devices to be controlled.

In case that the detection signals from the various measuring devices are processed by the computer, said signals take the form of parallel signals since they are produced simultaneously and if they are transmitted as such, an enormous amount of lines has to exist between the devices and the computer. If each detection signal is subjected to sampling, which is then transmitted in a series form, such enormous amount of lines can be avoided. Such converssion of signals from parallel to series can be done by the use of a shift register and the parallel signal stored in a first shift register can be shifted by clock pulses and transferred bit by bit series form to a second shift register. However, the clock pulse generator runs independently and thus it is not easy to control its setting, sending and stopping of the signal for the first register. Moreover, if the clock pulse is continuously sent to the shift register, data shift takes place even after transmission of one parallel signal is over, which gives rise to erroneous operatin.

SUMMARY OF THE INVENTION

It is an object of the present invention to provide a control system for a computer for on-line control wherein the job sequence and construction of the whole system is quite readily grasped and wherein complexity and labor in the preparation and change of the system can be lessened. It is another object of the invention to provide a system wherein the transmission of the signals from each device to be controlled to the computer for control can be effected readily, accurately and without any error.

The invention is further described in detail with reference to the drawings in which.

DESCRIPTION OF THE PREFERRED EMBODIMENTS

Figure 1:
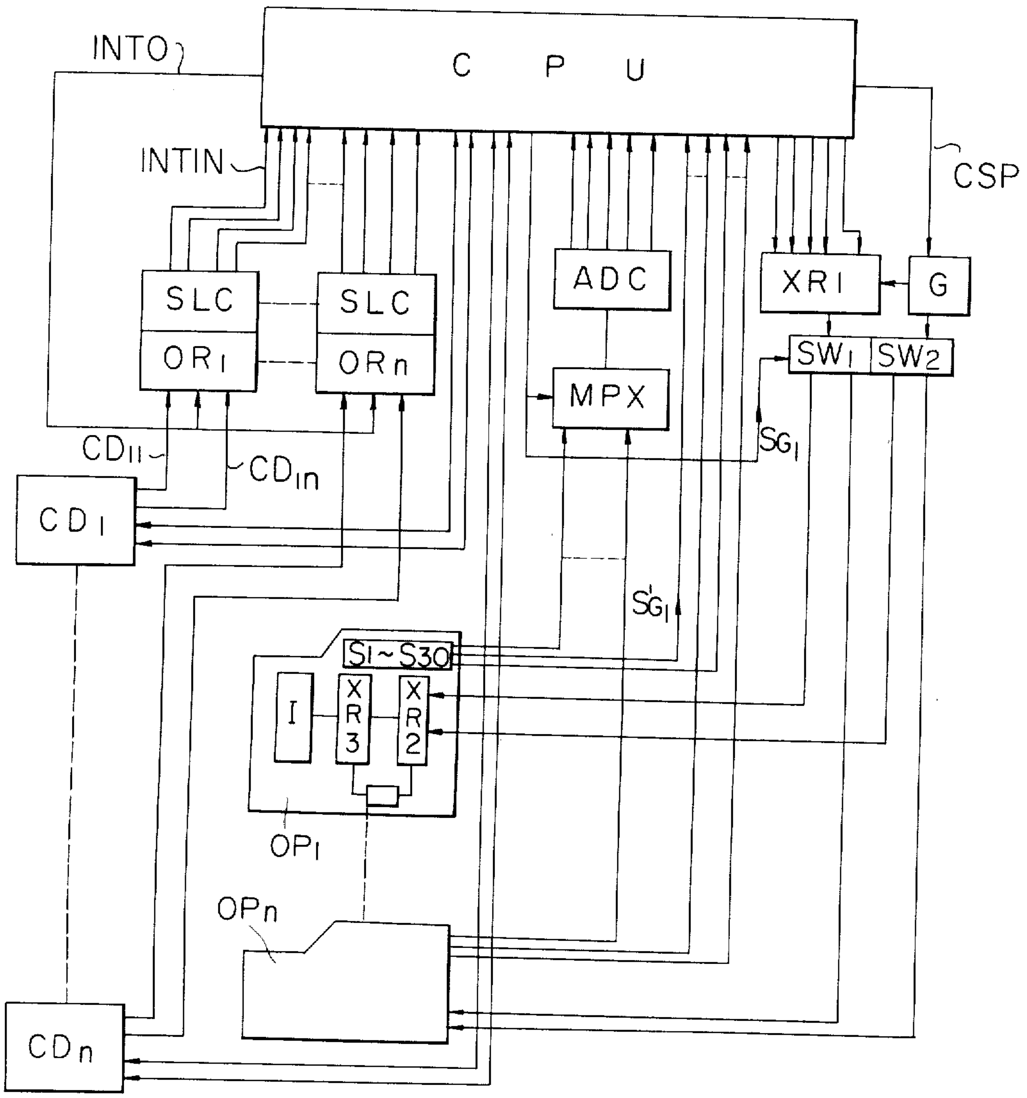
FIG. 1 is a block diagram illustrating the overall structure of the control system of the present invention.

FIG. 1 is a block diagram showing the overall structure of the control system of the present invention, in which the $CD_1$ to $CD_n$ are devices to be controled by the computer or central processing unit CPU; the $OP_1$ to $OP_n$ are operator's boxes or consoles for allowing the CPU to effect control of the operation of the $CD_1$ to $CD_n$; the $OR_1$ to $OR_n$ are OR circuits positioned with signal level converters SLC between the $CD_1$ to $CD_n$ and the CPU, the latter being provided in the same number as that of the devices to be controlled; the $SW_1$ and $SW_2$ are switching devices providing for signal transfer from the CPU to the OP console associated with the device then of the highest priority to be controlled by the interrupt signal; the MPX is a multiplexer; and the ADC is an analog to digital converter. The operation of each element is explained in detail below.

Figure 2:
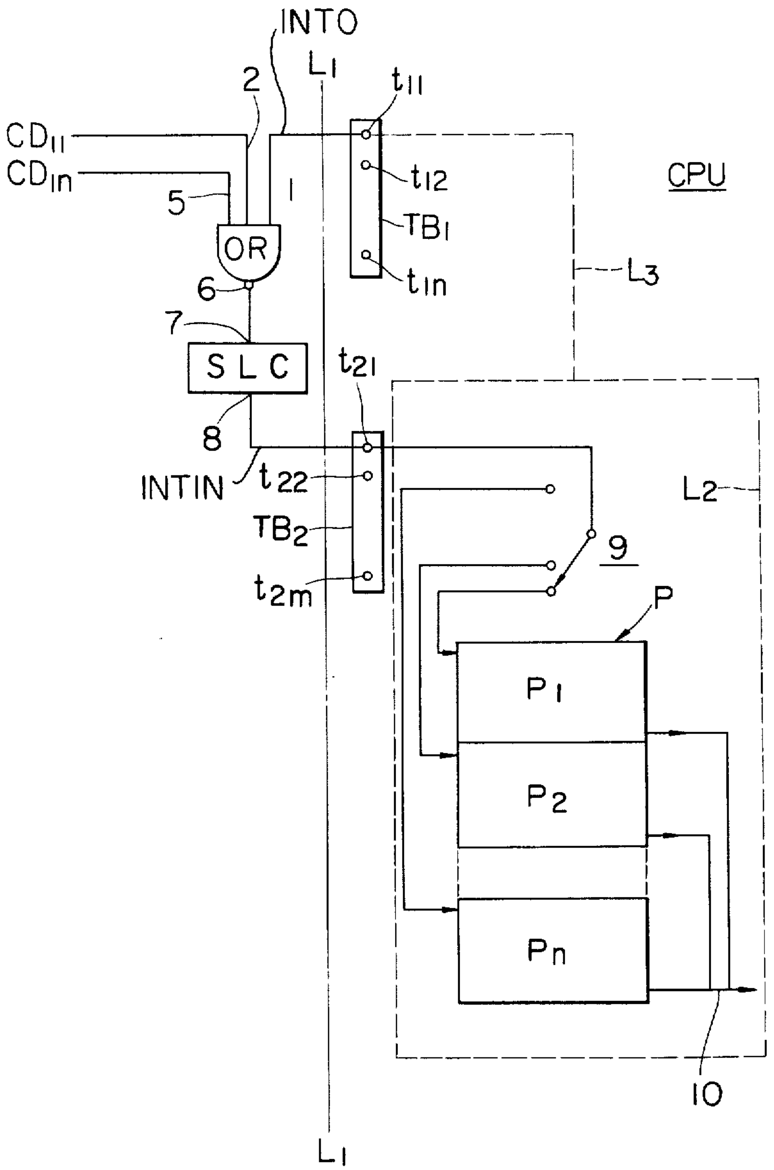
FIG. 2 is a schematic block diagram explaining the control system of the present invention.

FIG. 2 is a schematic block diagram explaining the control system of the present invention in which the right side of the line $L_1 - L_1$ is inside of the CPU and the left side thereof is outside of the CPU. In the inside of the computer, the part surrounded by the dotted line $L_2$ shown the device control program, the $TB_1$ is the output front end of computer and the $TB_2$ is the input front end for interrupt. Among terminals $t_{11}$ to $t_{in}$ of the output front end of computer $TB_1$, the terminal $t_{11}$ is on-off-controlled according to the computer program through the signal transmission system shown by dotted line $L_3$. The P indicates a main part of the program to control various devices $CD_1$ to $CD_2$. The program responding to the process interrupt signal from each of said devices constitutes one block. Some of these blocks are gathered to constitute one unit program P. In FIG. 2, this block is shown as $P_1$ to $P_n$, which number does not always accord with that of interrupt terminals m.

The units used outside the computer are described hereinafter.

The OR indicates an OR circuit provided according to the present invention, which has a plurality of input terminals 1, 2, ... 5. One of said terminals 1 is directly connected to the output terminal $t_{11}$ of the computer and receives one of the computer outputs INTO (interrupt out), for example an output of the timer interrupt program, which outputs are subjected to the on-off control by the instructions introduced into the internal storage device of the computer. The other input terminals 2 to 5 of the OR circuit are connected to the output terminals providing the process interrupt signals $CD_{11}$, $CD_{1n}$ of the devices to be controlled. Generally, there are many devices to be controlled even in one laboratory, each device having a plurality of output terminals providing a process interrupt signal. However, the output terminals providing the process interrupt signal to be connected to the input terminals 2 to 5 of one OR circuit should preferably be those of one device to be controlled for the reasons hereinafter described. The number of these input terminals can be increased or decreased as the case may require, of course. The output terminal 6 of the OR circuit is connected to the input terminal 7 of the signal level converter SLC. The output terminal 8 of the converter SLC is in turn connected to the INTIN (interrupt in) terminal $t_{21}$ of the input front end of interrupt $TB_2$. The converter SLC is intended to convert the output signal of the OR circuit so as to accord with the signal level of the interrupt input terminal of the computer. The converter SLC may, however, be omitted if the two signal levels accord with each other from the beginning.

Figure 4:
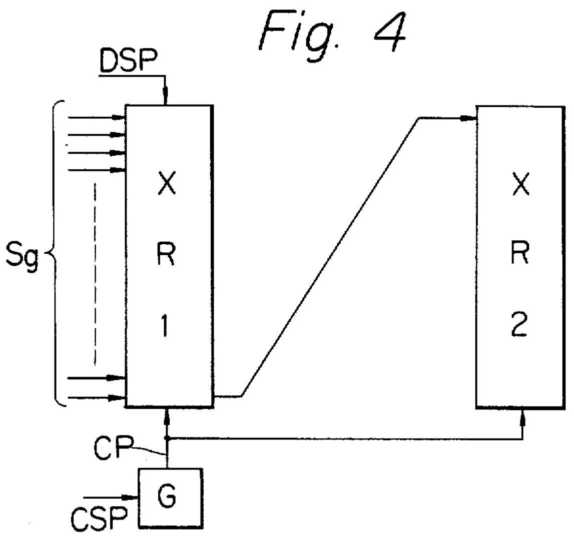
FIGS. 4 and 5 are explanatory diagrams showing signal transmission and control devices of the present invention.
Figures 5, 7:
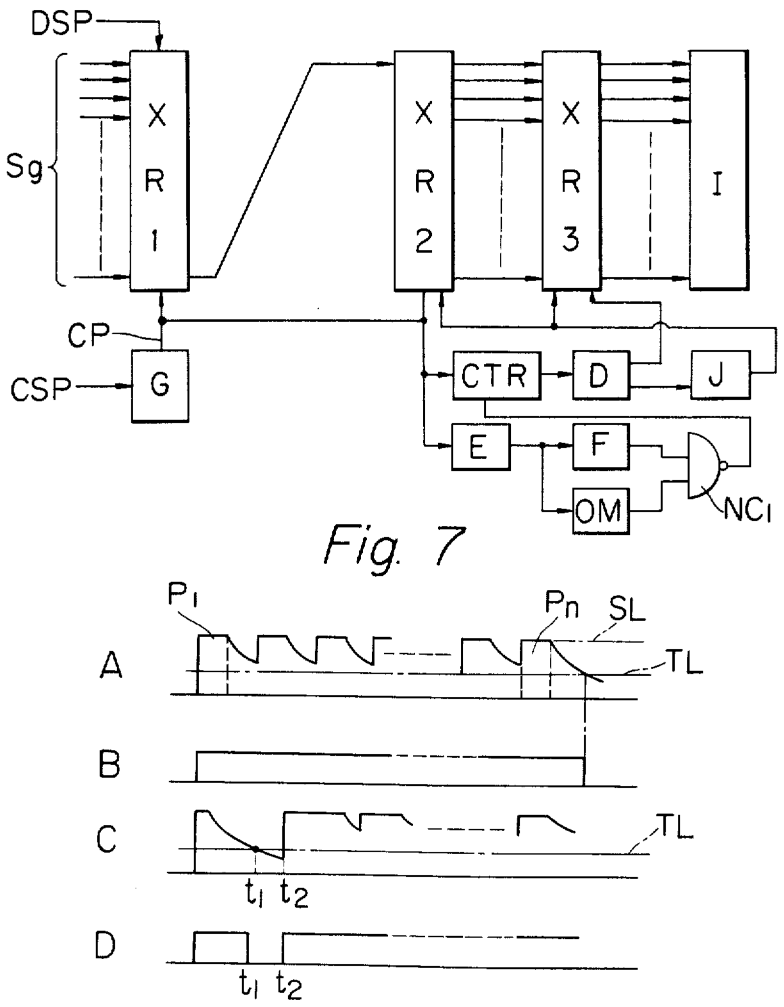
FIG. 7 is an explanatory diagram showing the operation of the noise preventing circuit for the signal transmission device shown in FIG. 5.
Figure 8:
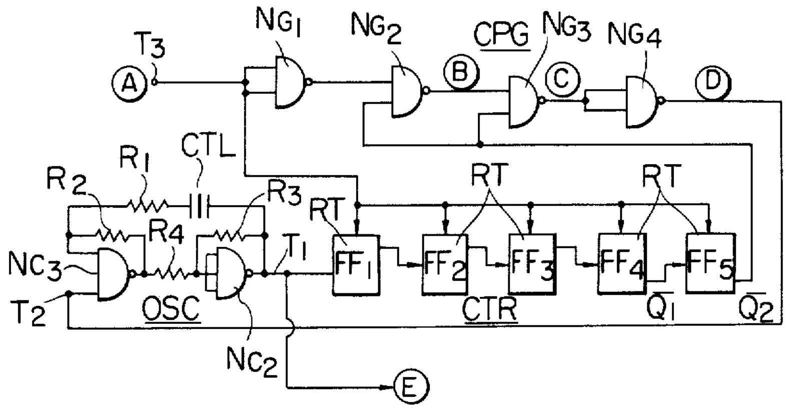
FIGS. 8 and 9 are explanatory diagrams for clock pulse genneration and control circuitry.
Figure 9:
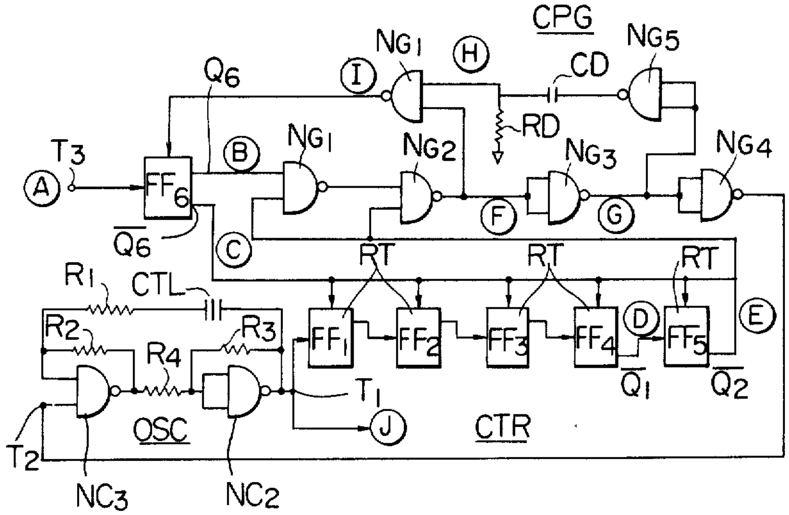

In FIG. 4, the $XR_1$ indicates a serial input type of shift register for 16 bits, the $XR_2$ also indicates a serial input type of shift register for 16 bits and the G indicates a clock pulse generator which generates 16 clock pulses, the same number as the number of the bits of these registers, when one start pulse CSP is applied thereto. The details are shown in FIGS. 8 and 9. In FIG. 5, the $XR_3$ is a serial input type buffer registor for 16 bits, the CTR is a counter circuit, the D is a differential circuit and the 1 is a display. FIG. 5 shows a noise preventing circuit for a signal transmission control circuit in which E is an integration circuit for pulses entering the counter circuit CTR, F is a wave shaper, OM is a one shot multivibrator, J is a delay circuit and $NC_1$ is a NAND circuit.

In the control pulse generator shown in FIGS. 8 and 9, the OSC is a crystal oscillator consisting of NAND circuits $NC_2$, $NC_3$, resistors $R_1$ $R_4$ and a crystal oscillator CTL; the CTR is a binary four digit counter circuit consisting of four flip-flop $FF_1$ to $FF_4$; the CPG is a control pulse generator consisting of the flip-flop $FF_5$ and four NAND gates $NG_1$ to $NG_4$. In FIG. 9, the $FF_6$ is a flip-flop, the $NG_5$ and $NG_6$ are NAND gates and the $C_D$ and $R_D$ are a capacitance and a resistance, respectively constructing a differential circuit. In the discrimination signal device of the operator's box in FIG. 12, the R is a divider consisting of many resistances $R_1$ to $R_{14}$, the Ta and Tb are the input terminals thereof, the $T_1$ to $T_{15}$ are the output terminals thereof, which are connected via the diodes $D_1$ to $D_{15}$ to the ends of push buttons $S_1$ to $S_{15}$. The $A_1$ and $A_2$ are amplifiers, MPX is a multiplexor, ADC is an analog-to digital converter and $NC_4$ is a NAND circuit.

The operation according to the present invention is as follows:

In ordinary operation, each device to be controlled $CD_1$, $CD_2$ ... $CD_n$ is controlled according to a predetermined program P whereby the operation of the operator's boxes $OP_1$ to $OP_n$ enables the signal to be transmitted from the discrimination signal device of FIG. 12 to the central processing unit CPU by means of the signal transmission control device as shown in FIG. 4 or FIG. 5. The operation of the discrimination signal device and the signal transmission control device is hereinafter described.

In a case that one of the process interrupt signals $CD_{11}$, $CD_{nn}$ is generated and one of the deviced is accordingly indicated to be preferably controlled, this signal will be transmitted to the interrupt input terminal $t_{21}$ through the OR circuit and the signal level converter SLC. It is then transmitted from the terminal $t_{21}$ to $P_1$, one of the blocks $P_1$ to $P_n$, designated by the program selection part 9 (for example, by a computed GC TO statement of FORTRAN or by selective switch) and execution of the processing by the block $P_1$. Finally, in order to designate a next processing block for the next interrupt signal, the program selection part 9 is switched and the present processing goes out from the outlet 10, sets itself and awaits the next interrupt signal. When the next interrupt signal, for example, $CD_{12}$ is generated, it passes through the OR circuit and the SLC to the terminal $t_{21}$, and then through the part 9 which has been switched at the previous CD signal, to the designated block such as $P_2$ whereby the predetermined processing is carried out. The same thing being repeated, the control proceeds.

When the processing by, for example, a program block $P_1$ is carried out according to an interrupt signal, a timer inside the computer has started and an interrupt signal may go out from the output terminal $t_{11}$ after a predetermined time is elapsed. In this case, even if there is no interrupt signal from the devices $CD_1$ to $CD_n$, the next program ($P_2$ in this case) is carried out by the interrupt signal from the computer.

In this apparatus, the program interrupt signal output terminal is connected to the input terminal of one OR circuit that should preferably be the same as that which the device to be controlled is connected to.

If so, the control programs of the devices to be controlled can be made block-wise per each interrupt processing unit, which may be collected to one unit program. Accordingly, the structure can readily be understood, and the order of generation of interrupt signals can preliminarily be determined so that the simultaneous generation of interrupt signals may be avoided and also the designation of the programs to be processed for the next interrupt signal may become possible. Moreover, it becomes possible to generate programming interrupt signals such as time-out signals from the timer inside the computer or input completion signals from operator's box by means of signal transmission system $L_3$ and place these signals into the system processing the interrupt signals from the device to be controlled, which results in a great promotion of the function of control of the device to be controlled or the processing of signals thereof.

Figure 3:
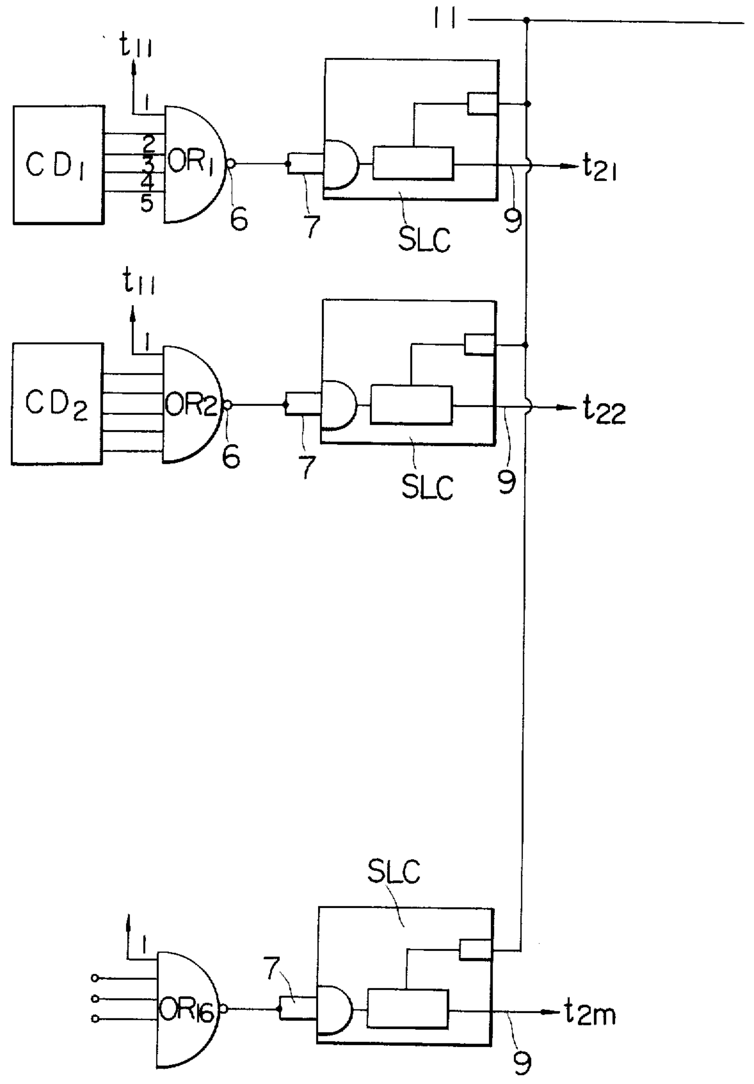
FIG. 3 is a detailed schematic block diagram of a part of FIG. 2.

FIG. 3 is a block diagram illustrating in more detail the units outside the computer shown in FIG. 2, in which the same parts have the same reference marks. In FIG. 3, sixteen OR circuits $OR_1$ to $OR_{16}$ are provided but the number of the OR circuits can be changed as the case may be. Each output terminal 6 of the OR circuit is connected via the signal level converter SLC to the respective interrupt input terminal $t_{21}$, $t_{22}$ . . . $t_{2m}$, which input terminals are accordingly connected to the devices to be controlled $CD_1$, $CD_2$ . . . , respectively. In case that the number of the interrupt signal outputs of the devices to be controlled is small, two or more devices can be connected to a common OR circuit while taking into account the order of generation of the signals. The numeral reference 11 is a line which supplies the reference voltage, for example, −20V, meeting the specification of the interrupt input terminals $t_{21}$ to $t_{2m}$ of the computer. The signal level converter SLC produces the same voltage as the reference voltage at any input signal from the OR circuit even if the level thereof differs from the reference voltage.

The structure or function of the discrimination device for the signals transmitted to the central processing unit CPU by the operation of push buttons on the operator's box is described as follows:

In the computer controlling device, it is necessary to generate signals discriminating the respective push buttons, send the same to the computer and make it possible for the computer to judge which button has been pushed. As the number of the push buttons is increased, the number of the transmission lines is increased. It is also necessary to have a counter-measure for the case that two or more buttons are erroneously pushed at one time. In the latter case, it has heretofore been proposed to prefer the discrimination signal for the button which has been pushed earliest, or to mechanically lock the buttons so that two or more of them can not be pushed at all, etc. These proposals have, however, a disadvantage that the structure becomes complex.

In the present invention, many push buttons are divided into a plurality of groups. Indication of each push button in each group is conducted by analog voltage having various levels and indication of the group to which each push button belongs is provided by the group-discriminating voltage generated by a switch closed simultaneously when the push button is pushed. In this way, it is possible to greatly decrease the number of the transmission lines. In addition, in order to generate the analog voltage for the push buttons, diodes facing in the same direction to a divider are used in this invention, so that, when a plurality of push buttons are simultaneously closed, the analog voltage for the push button having the highest level can be taken out preferentially. In this case the analog voltage for the other push buttons can not be taken out, being blocked by the inverse-biased diodes. Thus, there is no error occurring due to the mixing of the two voltages, nor is any accident occurring due to a short circuit of a part of the divider.

Figure 12:
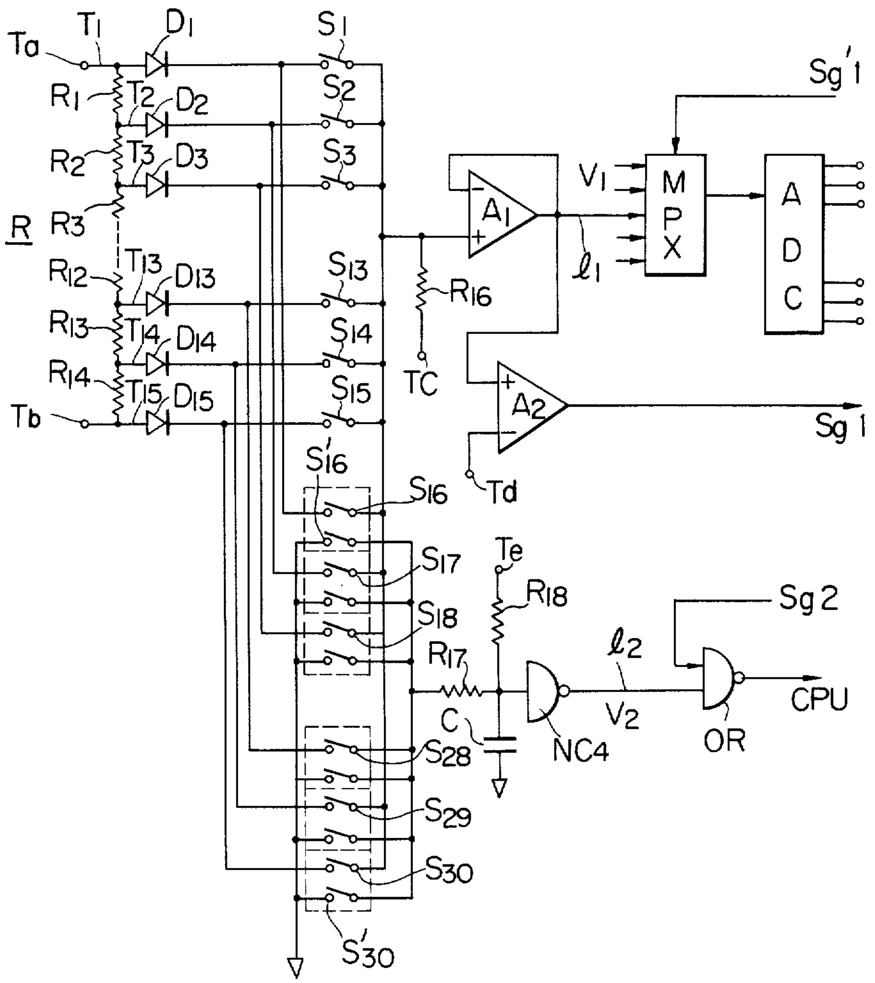
FIG. 12 is an explanatory diagram for the discrimination signal device of the present invention.

FIG. 12 shows an example thereof, in which R is a divider consisting of many resistances $R_1$ to $R_{14}$. The input terminal Ta receives for example, +10V while the input terminal Tb receives −10V. Many output terminals $T_1$ to $T_{15}$ are connected to the ends of the push buttons $S_1$ to $S_{15}$ via the diodes $D_1$ to $D_{15}$ facing in the same direction. The other end of each push button is connected in common to the input end of the amplifier $A_1$, which has high input impedance at unity amplification gain. In this example, it is also connected to the resistor $R_{16}$, one end of which is in turn connected to the terminal Tc to which is imparted −11V. The analog voltage 0 to $V_1$ for the push buttons is transmitted from the amplifier $A_1$ by means of a transmission line $l_1$ and introduced to the multiplexer MPX of the computer. After passing through the gate, it reaches the analog digital converter ADC. $A_2$ is a comparator which compares the reference voltage, or −10V in this case, applied to the terminal Td with the output voltage $V_1$ of the amplifier $A_1$ and generates signal $Sg_1$ indicating that a first or second group push button has been operated.

To the first-group push buttons $S_1$ to $S_{15}$ are respectively parallel connected the push buttons $S_{16}$ to $S_{30}$ which belong to the second group. Aside these push buttons $S_{16}$ to $S_{30}$ are provided the other switches $S'_{16}$ to $S'_{30}$ closed simultaneously with push buttons $S_{16}$ to $S_{30}$. The switches, $S'_{16}$ to $S'_{30}$ are connected in parallel with each other, one end of each being connected to a neutral point and the other end of each being connected to the input end of the NAND circuit $NC_4$ via the resistor $R_{17}$. To this input end, one end of resistor $R_{18}$ and one end of condenser C are connected. In this example, the opposite end of said resistor $R_{18}$ is connected to the terminal Te on which the voltage 5V is imparted, while the opposite end of said condenser C is connected to a neutral point. The electric voltage $V_2$ for discriminating the second group is produced by the NAND circuit $NC_4$ and is led through an OR circuit to the computer through the transmission line $l_2$.

The operation of the circuit is as follows:

Under the conditions that one of the push buttons is not pushed, the output of the amplifier $A_1$ is −10V and that of the comparator $A_2$ is also −10V. When the push button $S_1$ is pushed, the electric voltage of about +10V enters the amplifier $A_1$, which produces about +10V. This voltage enters the comparator $A_2$. Since it is higher than the reference voltage −10V imparted to terminal Td, the comparator $A_2$ changes its output from −10V to +10V. The change from −10V to +10V provides the signal $Sg_1$ for the computer, and thus the computer opens the gate for the multiplexer MPX by generating the gate signal $S'g_1$, and sends the output voltage of the amplifier $A_l$ to the analog to digital converter ADC so as to make it digital and thus generates the analog signal for the push button $S_1$. When the push buttons $S_2$, $S_3$, etc. are pushed, the partial voltages of the terminals $T_2$, $T_3$ . . . is imparted to the amplifier $A_1$, which produces sequentially decremented discrimination voltage (different from that in the preceding case). These voltages are also compared in the comparator $A_2$. Since each of them is higher than the reference voltage, the output of the comparator $A_2$ changes from −10V to +10V, which produces the signal $Sg_1$ whereby the gate of the multiplexer MPX opens to conduct the AD conversion of the discrimination voltage.

When the buttons $S_{16}$ to $S_{30}$ belonging to the second group are pushed, the discrimination voltage 0 to $V_1$ for the push buttons generates as before so as to effect discrimination of the switches. In this case, the adjacent switches $S'_{16}$ to $S'_{30}$ are also closed. The NAND circuit $NC_4$ therefore at +5V via the resister $R_{18}$ is at zero voltage via the low resistor $R_{17}$ of small resistance and one of the switches $S_{16}$ to $S_{30}$. As a result, the output of the NAND circuit becomes 1, say 5V. This voltage is used as the discrimination voltage $V_2$ for the second group, which is transmitted to the OR circuit and after being gated by the gate signal $S'g_2$, generates the group-discriminating bit. In this way, many push button switches are respectively discriminated by the discriminating voltage O $V_1$ and $V_2$.

The transmission control device for the signal to be transmitted from CPU to the operator's box OP is described as follows:

In FIG. 4, the $XR_1$ is a parallel input type shift register for 16 bits, the $XR_2$ is also a serial input type shift register for 16 bits, and the G is a clock pulse generator capable of generating the same 16 clock pulses as the number of bits of these registers upon receipt of one start pulse.

Figure 6:
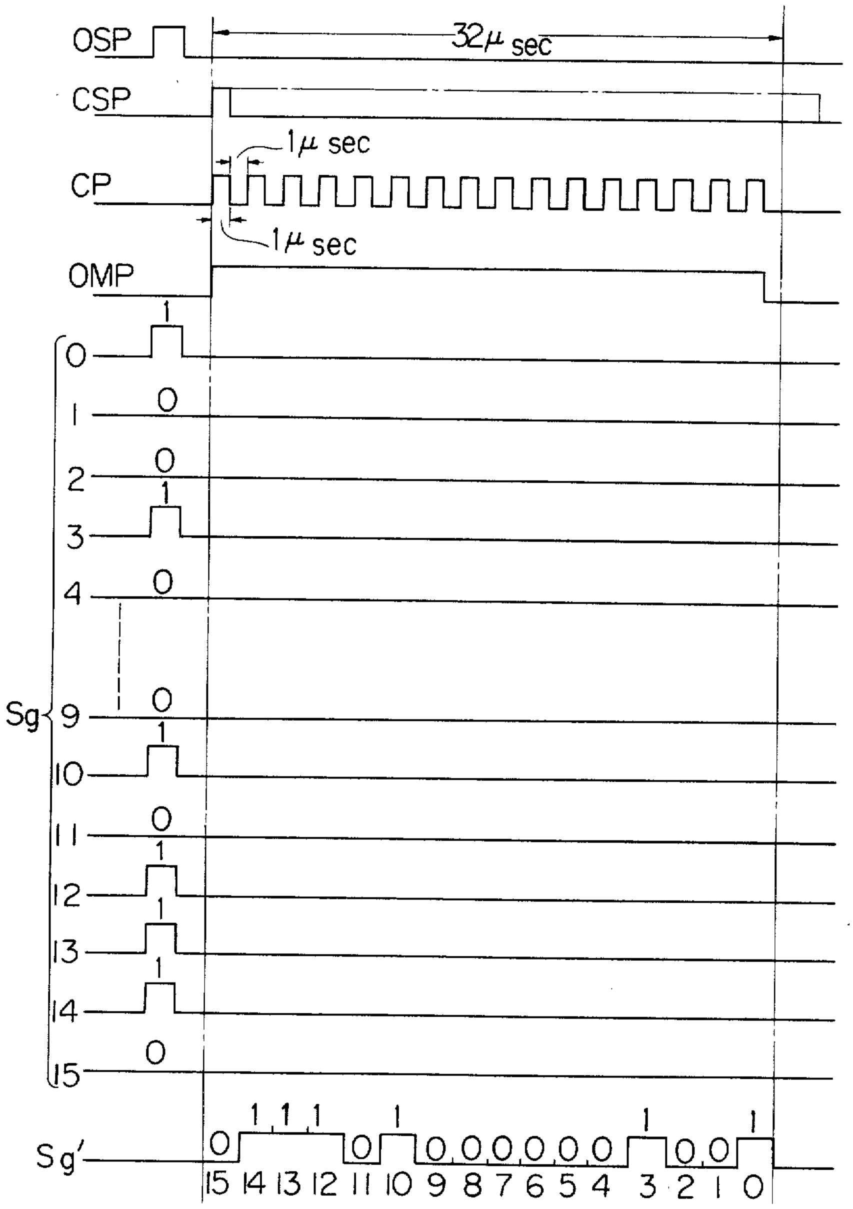
FIG. 6 is an explanatory diagram showing the operation of the signal transmission device of FIG. 4.

The operation of the device of FIG. 4 can be explained with reference to the timing charg of FIG. 6.

When the parallel signal Sg is being applied to the parallel input terminals of the shift register $XR_1$, and when the data set pulses DSP come, the parallel signal Sg for 16 bits consisting of 1, 0 is stored in each flip-flop step of the shift register $XR_1$. When the start pulse CSP is imparted to the clock pulse generator G, the pulse generator G generates 16 clock pulses as shown in FIG. 6, the width and the pause period of which islusec each. When the clock pulses CP enter the clock pulse terminal of the shift register $XR_1$ one by one, the parallel signal Sg stored in this register is shifted bit by bit and transferred to the shift register $XR_2$. The parallel signal Sg is completely transferred to the shift register $XR_2$ by 16 clock pulses. The Sg shown in FIG. 6 indicates the signal Sg being transferred in the form of serial signal.

According to the present invention, the clock pulse generator generates 16 clock pulses by the clock start pulse CSP and thereafter the oscillation stops automatically. Therefore, the transmission of one parallel signal in serial form can be effected very simply. This oscillation control device is hereinafter described in detail.

This example is directed to the signal transmission from the parallel input type shift register $XR_1$ to the serial input type shift register $XR_2$, but the invention can be applied to the signal transmission from the serial input type shift register to another serial input type shift register. In addition, the number of bits of the transmitted signal and the shift register is not limited to 16 but can be any number. The change of the number of bits can be effected only by changing the number of bits of the shift register and the number of pulses generated in the pulse generator.

FIG. 5 shows a modified example of the present invention. In this example, there is a similar signal transmission part consisting of the shift register $XR_1$, $XR_2$ and the clock pulse generator G, to which are added; the parallel input type buffer register $XR_3$ for 16 bits, the counter circuit CTR for binary four capable of counting clock pulses, the differential circuit D providing set pulses which stores the content of the register $XR_2$ in the register $XR_3$ by differentiating the output of the counter circuit, and the display I.

In this device, the parallel signal Sg is accumulated in the shift register $XR_1$ by the data set pulse DSP. The pulse generator G generates 16 clock pulses whereby the signal is transmitted in a serial form to the shift register $XR_2$ as is the case with FIG. 4.

In FIG. 5, however, the clock pulse CP is counted by the counter circuit CTR, and at the time when sixteen is counted, the circuit CTR produces the output pulse. The differential circuit D differentiates the pulse, and the data of the register $XR_2$ is transmitted to the register $XR_3$ by means of the differentiation pulse.

It is not until the transmitted signal Sg is transferred to the register $XR_3$ that the display I effects indication of the signal Sg.

According to this device, when the signal is transmitted completely to the register $XR_2$, it is passed to the buffer register $XR_3$ and the indication of the signal begins. Accordingly, there is no fear of erroneous indication of the signal.

When a noise pulse is applied to the clock pulse terminal, erroneous operation is possible. Even in this case, however, erroneous operation does not occur in this invention.

As shown in FIG. 5, a noise prevention device consisting of the integration circuit E, the wave shaping circuit F, the one shot multivibrator OM and the NAND circuit $NO_1$ is used to prevent erroenous operation in this invention. When the clock pulse is added to the registers $XR_1$ and $XR_2$ to transfer the signal, this pulse is also applied to the integration circuit E. The integration circuit E produces the output A of FIG. 7 when the pulses $P_l$ to $P_n$ are imparted thereto. As the time constant for charging the capacitor in the integration circuit is small, the output of the amplifier reaches the saturation level SL immediately after the pulse $P_l$ is introduced. Thereafter the capacitor discharges through the resistor of the integration circuit and thus the output gradually decreases, resulting in a saw-tooth wave form. The wave shaping circuit F has a threshold level TL shown in A in FIG. 7. The output of the integration circuit E does not become lower than the threshold level TL so long as the clock pulse occurs. Consequently, the output of said circuit F is shown as B in said Figure. The one shot multivibrator OM produces the pulse OMP shown in FIG. 6 immediately after the integration circuit E produces its output. The output of the NAND circuit $NC_1$ becomes zero as it receives the output 1 of both circuits F and OM, whereby the reset signal which has been sent to the counter circuit CTR disappears. As a result of this, the CTR can start counting the clock pulse CP. As set forth hereinabove, when 16 pulses are counted, the output pulse is generated, which permits the transfer of the signal from the register $XR_2$ to the register $XR_3$. Contrary to this, in case that the pulse imparted to the registers $XR_1$, $XR_2$ and the counter circuit is not the clock pulse but a noise pulse, the width, amplitude and cycle of the pulse vary generally from those of the clock pulse. If this noise pulse is narrower, smaller or longer with respect to the pulse width, the amplitude or the pause period, respectively, than the clock pulse CP, the terminal voltage of the capacitor of the integration circuit E recedes to below the expected level and the output voltage of the amplifier comes to cut the threshold level TL at the time $t_1$ as shown in C of FIG. 7. At this stage, the output of the wave shaper circuit becomes zero as shown in D of said Figure. Thus, the otput of the NAND circuit $NC_l$ becomes 1, sending the reset signal to reset the counter circuit CTR to zero. As a result, the counter circuit CRT does not produce the output, whereby the transfer of the signal is not effected. If the noise pulse possesses a wide pulse width, a short pulse period and a sufficient amplitude, the output of the integration circuit B does not recede to below the threshold level SL and thus the reset of the counter circuit CTR does not take place. In this case, one shot multivibrator OM protects against error. That is, the OM has the output of 1 only for the period corresponding to 16 clock pulses and thereafter the output becomes zero. Therefore, if 16 pulses do not come during that period, the NAND circuit $NC_1$ resets the counter circuit CTR.

As detailed in detail above, according to the present invention, the noise pulse is compared with the clock pulse from both angles, that is, the wave form of pulse such as amplitude and width, etc., and its repeated cycles, and if there is any difference therebetween the counter circuit is reset to prevent transfer of the signal. Therefore, erroneous operation due to noise in the signal transmission circuit can be prevented substantially completely.

The oscillation control circuit is hereinafter explained with respect to the drawing. In FIG. 8, the OSC is shown to be a crystal oscillator consisting of the NAND circuits $NC_2$, $NC_3$, resistors $R_l$ to $R_n$ and the crystal oscillating element CTL, which oscillates to send the clock pulse from the output terminal $T_1$ when the control pulse is received by the oscillation control terminal T. Other oscillators such as an RC oscillator may be used instead of said oscillator. The CTR is a counter circuit for binary four consisting of four flip-flops $FF_1$ to $FF_4$, which produces its output when 16 pulses are counted. The CPG is a control pulse generator composed of the flip-flop $FF_5$ and four NAND gates $NG_1$ to $NG_4$.

The operation of this circuit is described below with reference to FIG. 10.

When the start pulse is not applied to the input terminal $T_3$ of the control pulse generator CPG, the reset terminal RT of the flip-flop $FF_1$ to $FF_5$ is at zero and thereby the counter circuit CTR is not enabled to count. The flip-flop $FF_5$ of the CPG thus provides a 1 on the terminal $\overline{Q_2}$. The NAND gate $NG_1$ produces the output "1" when the input is "zero" while the NAND gate NG produces the output "zero," receiving the inputs 1 and 1. The NAND gate $NG_3$ produces the output 1, receiving the inputs "zero" and 1. Accordingly, the NAND gate $NG_4$ produces the output "zero," stopping oscillation of the oscillator OSC.

Figure 10:
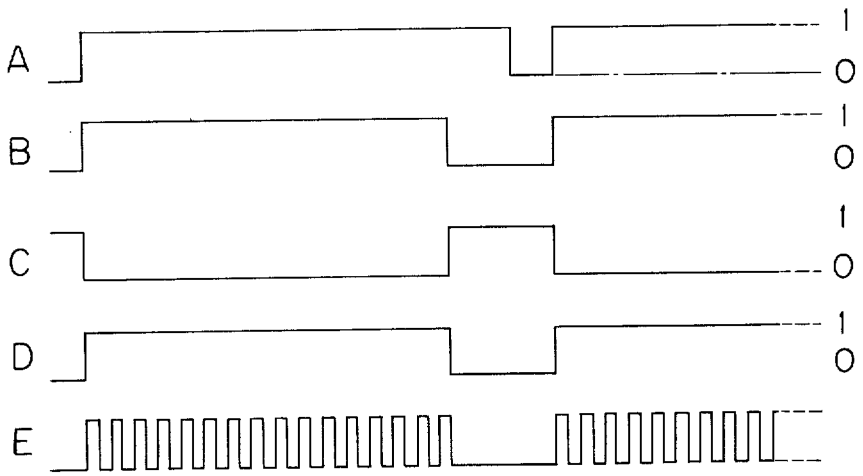
FIGS. 10 and 11 are explanatory diagrams for the respective of the circuitry of FIGS. 8 and 9.

When the start pulse shown as A in FIG. 10 applied to the input terminal $T_3$, the signal 1 enters each reset terminal of the flip-flops $FF_1$ to $FF_5$, whereby the reset condition is released and the CTR is enabled to count. On the other hand, the output of the NAND gate $NG_1$ becomes "zero," whereby the output of each NAND gate $NG_2$, $NG_3$, $NG_4$ becomes "zero," 1 and "zero," respectively, as shown in B to D of FIG. 10, and the OSC stops its oscillation. The start pulse continues for more than the period required for generating 16 clock pulses and thereafter becomes "zero" as shown in A of FIG. 10. In this way, the predetermined number, or 16 in this example, of clock pulses are generated when one start pulse is received.

FIG. 9 shows another example of the present invention in which the same references indicate the same parts. In this example, the pulse having narrow width is used as the start pulse as shown in A of FIG. 11. For this reason, the flip-flop $FF_6$, the NAND gates $NG_5$ and $NG_6$, the condenser $C_D$ and the resistor $R_D$ constituting a differential circuit are additionally used.

The operation of this circuit is as follows:

When the start pulse is not applied to the input terminal $T_3$ of the control pulse generator CPG, the flip-flop $FF_6$ is under reset conditions and its terminal $\overline{Q_6}$ is producing the output 1. This output 1 is received by the flip-flops $FF_1$ to $FF_5$ on their reset terminal RT. Under the circumstances, the counter circuit CTR is under conditions that it can not effect the counting operation while indicating "zero" as the count value. In addition, the flip-flop $FF_6$ produces the output "zero" on the terminal $Q_6$. The NAND gates $NG_1$ to $NG_4$ work as in FIG. 1 and the "zero" is imparted to the oscillation control terminal $T_2$ of the oscillator OSC and the oscillation is stopped. The NAND gate $NG_6$, receiving the "zero" signal respectively from the NAND gate B and the differential circuit $C_1$, produces the output 1, which is imparted to the reset terminal of the flip-flop $FF_6$. The $FF_6$ is thus enabled.

Figure 11:
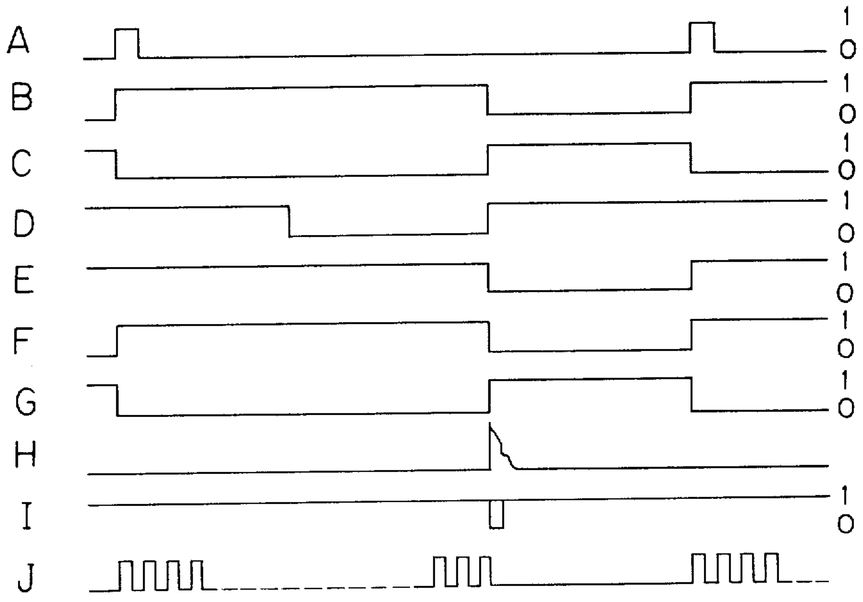

When the start pulse enters the input terminal $T_3$ as shown in A of FIG. 11, the flip-flop $FF_6$ reverses its condition such that the output terminal $Q_6$ is 1, $\overline{Q_6}$ is "zero" whereby the flip-flops $FF_1$ to $FF_5$ are released from the reset condition and enabled. Moreover, the NAND gate group $NG_1$ to $NG_4$ reverses its output condition and the output of the NAND gate in the final step becomes 1 so that the OSC starts oscillation, sending clock pulses shown in J of FIG. 11. These clock pulses are counted by the counter CTR. When 16 pulses are counted, the flip-flop $FF_4$ of the final step produces its output, reversing the condition of the flip-flop $FF_5$. Accordingly, the terminal $\overline{Q_2}$ of the flip-flop $FF_5$ provides a "zero" output, reversing the condition of NAND gates $NG_1$ to $NG_4$ to stop oscillation of the oscillator OSC. In this way, it is possible to generate the predetermined 16 clock pulses upon receipt of one start pulse. When 16 pulses are counted and the NAND gates $NG_1$ to $NG_4$ reverse their conditions, the NAND gate $NG_5$ receives the 1 from the $NG_3$ as shown in G of FIG. 11, and its output becomes "zero." This change of condition is differentiated in the differential circuits $C_D$, $R_D$ and the NAND gate $NG_6$ receives the pulse as shown in H of FIG. 11. In addition, this NAND gate receives the "zero" output from the $NG_2$ as shown in F of FIG. 11. Thus this NAND gate $NG_6$ indicates "zero" slightly later than the time when the output of the $NG_4$ becomes "zero," and thereafter indicates 1 again as shown in I of FIG. 11. The output of this NAND gate $NG_6$ acts to reset the flip-flop $FF_6$ for control of oscillation whereby the terminal $Q_6$ becomes "zero" and the terminal $\overline{Q_6}$ becomes 1. As a result, the CTR is reset and preserves this condition with the content "zero" until the next start pulse comes to reverse the flip-flop $FF_6$. The flip-flop $FF_6$ is also reset to produce the output "1" on the terminal $\overline{Q_2}$. All circuits return to the original conditions in the above manner.

As set forth above, the described combination system makes it possible for a lot of input signals to be received by one interrupt terminal. Furthermore, by means of applying the computer output subject to program control from the terminal $t_{11}$ to the input terminal 1 of the OR circuit, it becomes possible to utilize the computer output for control or signal processing of the devices to be controlled.

In addition thereto, even if the interrupt signal is transmitted in an random order from each device to be controlled, it is possible to control these in a preferential order. Also according to the present invention, there is no fear of erroneous operation due to any possible noise coming from the circumstances. Accordingly, the present invention guarantees a secure control of any device to be controlled.

We claim:

1. In an information processing system having:

a. a plurality of processing devices, each having
 1. an output terminal and applying thereto a signal indicative of a process interrupt condition for such processing device, and
 2. an input terminal for receiving a signal indicative of a function to be performed by such processing device; and b. a programmed computer for on-line control of said processing devices, said computer having
 1. a first output terminal and applying thereto a signal indicative of a program interrupt condition for said computer,
 2. second output terminals and applying separately thereto signals indicative of functions to be performed by said processing devices, and
 3. first input terminals for separate receipt of signals indicative of device process interrupt conditions; the improvement comprising:

c. OR circuit means in number equal to the number of said processing devices, each said OR circuit means having first and second input terminals and an output terminal;

d. first circuit means for connecting said computer first output terminal in common to said OR circuit means first input terminals;

e. second circuit means for connecting each said processing device output terminal to a distinct one of said OR circuit means second input terminals;

f. third circuit means for connecting said OR circuit means output terminals in common to an exclusive one of said computer first input terminals.

2. The invention claimed in claim 1 wherein said information system further includes an operator console for each said processing device, said computer generating data signals for said operator consoles and a clock signal indicative of such data signal generation, said improvement further comprising first and second series-connected shift registers, each having a shift input terminal and *n* stages, and a pulse generator responsive to said clock signal to generate *n* successive clock pulses, third means for simultaneously applying said data signals to said first register and fourth means for applying said clock pulses to said shift input terminals of said first and second shift registers, thereby providing for the transfer of said data signals to said second shift register.

3. The invention claimed in claim 2, wherein each said operator console includes a data indicator and wherein said *n* second shift register stages each have an output terminal, said improvement further comprising a third shift register having *n* stages each having a gated input terminal and an output terminal, counter means for providing an output signal upon each counting thereby of *n* successive said clock pulses, fifth means for connecting said second shift register output terminals individually to said third shift register gated input terminals, sixth means applying said counter means output signal to said third shift register for enabling said gated input terminals thereof for the transfer of said data signals to said third shift register and seventh means connecting said third shift register output terminals to said indicator.

4. The invention claimed in claim 3 wherein said improvement further comprises counter control circuit means for enabling said counter means exclusively during the period of occurrence of each group of said *n* clock pulses and for resetting said counter means to zero count during such period upon receipt by said counter means of a pulse having configuration of less than preselected relation to a predetermined configuration of said clock pulses.

5. The invention claimed in claim 2 wherein said pulse generator comprises an oscillator having an input control terminal, said oscillator generating output pulses on application of a first level voltage to said input control terminal and discontinuing the generation of output pulses on application of a second level voltage to said input control terminal, a plurality of series-connected flip-flops for counting said output pulses and resettable to zero count upon receipt of said second level voltage thereto, coincidence circuit means responsive to said computer-generated clock signal to generate said first level signal and apply same to said input control terminal and operative upon a predetermined pulse count by said flip-flop plurality to generate said second level signal and apply same to said input control terminal and to said flip-flop plurality.

6. In an information processing system having:

a. a plurality of processing devices, each having 1. an output terminal and applying thereto a signal indicative of a process interrupt condition for such processing device, and
2. an input terminal for receiving a signal indicative of a function to be performed by such processing device;

b. an operator console for each such processing device having a plurality of operator-controlled switch means, each switch means being assigned to a distinct function performable by such processing device; and c. a programmed computer for on-line control of said processing devices in accordance with operation of said console switch means, said computer having 1. a first output terminal and applying thereto a signal indicative of a program interrupt condition for said computer,
2. second output terminals and applying separately thereto signals indicative of functions to be performed by said processing devices,
3. first input terminals for separate receipt of signals indicative of device process interrupt conditions, and
4. second input terminals for receipt of signals indicative of operated switches of said consoles;

the improvement comprising:

d. OR circuit means in number equal to the number of said processing devices, each said OR circuit means having first and second input terminals and an output terminal;

e. first circuit means for connecting said computer first output terminal in common to said OR circuit means first input terminals;

f. second circuit means for connecting each said processing device output terminal to a distinct one of said OR circuit means second input terminals;

g. third circuit means for connecting said OR circuit means output terminals in common to an exclusive one of said computer first input terminals; and h. fourth circuit means connected to said switch means for applying to said computer second input terminals first signals each indicative separately for each console of the operation of a switch means thereof and second signals indicative of the processing device function assigned to such operated switch means.

7. In an information processing system having:

a. a plurality of processing devices, each having 1. an output terminal and applying thereto a signal indicative of a process interrupt condition for such processing device, and
2. an input terminal for receiving a signal indicative of a function to be performed by such processing device;

b. an operator console for each such processing device having a plurality of operator-controlled switch means, each switch means being of distinct priority and assigned to a distinct function performable by such processing device; and c. a programmed computer for on-line control of said processing devices in accordance with operation of said console switch means, said computer having 1. a first output terminal and applying thereto a signal indicative of a program interrupt condition for said computer,
2. second output terminals and applying separately thereto signals indicative of functions to be performed by said processing devices, 3. first input terminals for separate receipt of signals indicative of device process interrupt conditions, and
4. second input terminals for receipt of signals indicative of operated switches of said consoles;

the improvement comprising:

d. OR circuit means in number equal to the number of said processing devices, each said OR circuit means having first and second input terminals and an output terminal;
e. first circuit means for connecting said computer first output terminal in common to said OR circuit means first input terminals;
f. second circuit means for connecting each said processing device output terminal to a distinct one of said OR circuit means second input terminals;
g. third circuit means for connecting said OR circuit means output terminals in common to an exclusive one of said computer first input terminals; and
h. fourth circuit means connected to said switch means for applying to said computer second input terminals first signals each indicative separately for each console of the operation of said switch means thereof and second signals indicative of the processing device function assigned to the highest priority switch means of such operated switch means.

8. The invention claimed in claim 7 wherein each said operator-controlled switch means includes a switch having first and second terminals, said fourth circuit means comprising for each said operator console a voltage divider having a plurality of output terminals, a plurality of diodes each having first and second electrodes, means for connecting each said first electrode to a distinct one of said voltage divider output terminals, means for connecting each said second electrode to a distinct one of said switch first terminals, and voltage comparator circuit means receiving first and second reference voltages and having an input terminal connected in common to all of said switch second terminals, said voltage comparator means generating a signal of first preselected amplitude on the operation of any of said switches, such generated signal constituting said fourth circuit means first signal for one said operator console, said voltage comparator means generating a further signal having amplitude selectively indicative of the one of such operated switches deriving highest amplitude voltage from said voltage divider, such further generated signal constituting said fourth circuit means second signal for one said operator console.

* * * * *